United States Patent
Yokoyama et al.

(10) Patent No.: US 10,793,704 B2
(45) Date of Patent: Oct. 6, 2020

(54) NITRILE COPOLYMER RUBBER COMPOSITION, CROSS-LINK RUBBER COMPOSITION, AND CROSS-LINKED RUBBER

(71) Applicant: ZEON CORPORATION, Tokyo (JP)

(72) Inventors: Seiji Yokoyama, Tokyo (JP); Hiroyasu Nagamori, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 96 days.

(21) Appl. No.: 16/076,761

(22) PCT Filed: Feb. 21, 2017

(86) PCT No.: PCT/JP2017/006374
§ 371 (c)(1),
(2) Date: Aug. 9, 2018

(87) PCT Pub. No.: WO2017/146046
PCT Pub. Date: Aug. 31, 2017

(65) Prior Publication Data
US 2019/0040237 A1 Feb. 7, 2019

(30) Foreign Application Priority Data
Feb. 23, 2016 (JP) ................. 2016-032019

(51) Int. Cl.
*C08L 9/02* (2006.01)
*C08L 27/06* (2006.01)

(52) U.S. Cl.
CPC .............. *C08L 9/02* (2013.01); *C08L 27/06* (2013.01); *C08L 2205/025* (2013.01); *C08L 2205/03* (2013.01)

(58) Field of Classification Search
CPC ........ C08L 27/06; C08L 9/02; C08L 2205/03; C08L 2205/025; C08K 5/11
See application file for complete search history.

(56) References Cited

U.S. PATENT DOCUMENTS

| 3,764,324 A | 10/1973 | Reyes et al. |
| 5,344,864 A | 9/1994 | Kushida et al. |
| 5,416,146 A | 5/1995 | Kushida et al. |
| 2006/0155024 A1 | 7/2006 | Suzuki |
| 2010/0330319 A1 | 12/2010 | Tsukada et al. |
| 2014/0100315 A1 | 4/2014 | Tsukada et al. |
| 2015/0099841 A1* | 4/2015 | Tsukada et al. ......... C08K 3/34 524/450 |
| 2015/0368447 A1* | 12/2015 | Katada ..................... C08K 5/17 525/329.3 |

FOREIGN PATENT DOCUMENTS

| EP | 2246389 A1 | 11/2010 |
| JP | S56-044100 B2 | 10/1981 |
| JP | S60-155246 A | 8/1985 |
| JP | S60-155247 A | 8/1985 |
| JP | S60-195137 A | 10/1985 |
| JP | S60-195138 A | 10/1985 |
| JP | S61-192755 A | 8/1986 |
| JP | H02-124958 A | 5/1990 |
| JP | H10-279733 A | 10/1998 |
| JP | H11-035737 A | 2/1999 |
| JP | 2007-277341 A | 10/2007 |
| WO | 2005/005538 A1 | 1/2005 |

OTHER PUBLICATIONS

Apr. 11, 2017 International Search Report issued in International Patent Application No. PCT/JP2017/006374.
Feb. 12, 2019 Office Action issued in Pakistani Application No. 105/2017.
Aug. 28, 2018 International Preliminary Report on Patentability issued in International Patent Application No. PCT/JP2017/006374.
Sep. 2, 2019 Search Report issued in European Patent Application No. 17756484.6.

* cited by examiner

*Primary Examiner* — Nathan M Nutter
(74) *Attorney, Agent, or Firm* — Oliff PLC

(57) ABSTRACT

A nitrile copolymer rubber composition has a nitrile copolymer rubber (A) containing 22 to 45 wt % of $\alpha,\beta$-ethylenically unsaturated nitrile monomer units and a vinyl chloride resin (B) having an average polymerization degree of 1200 to 2200, wherein a ratio of content of the vinyl chloride resin (B) with respect to 100 parts by weight of the nitrile copolymer rubber (A) is 70 to 140 parts by weight.

8 Claims, No Drawings

NITRILE COPOLYMER RUBBER COMPOSITION, CROSS-LINK RUBBER COMPOSITION, AND CROSS-LINKED RUBBER

TECHNICAL FIELD

The present invention relates to a nitrile copolymer rubber composition able to give a cross-linked rubber excellent in cold resistance, ozone resistance, oil resistance, and compression set and a cross-linkable rubber composition and a cross-linked rubber obtained using that nitrile copolymer rubber composition.

BACKGROUND ART

Since the past, a rubber containing α,β-ethylenically unsaturated nitrile monomer units and conjugated diene monomer units (nitrile copolymer rubber) has been known as a rubber excellent in oil resistance and has mainly been used as a material for various automotive rubber products used around oils such as fuel hoses, gaskets, packings, and oil seals.

In such rubber products, further improvements in overall performance such as cold resistance, ozone resistance, and oil resistance are continuously being sought. For this reason, improvement in such properties is being sought in nitrile copolymer rubber as well.

For example, Patent Document 1 discloses a vulcanizable nitrile copolymer rubber composition, which can give a vulcanized robber having a brittle temperature of −50 to −5° C., comprising 100 parts by weight of a nitrile copolymer rubber having 55 to 80 wt % of α,β-ethylenically unsaturated nitrile monomer units, 10 to 100 parts by weight of an acrylic-based resin or vinyl chloride-based resin, 5 to 500 parts by weight of a filler, 0.1 to 200 parts by weight of a plasticizer, and a vulcanizing agent. However, the cross-linked rubber obtained using the rubber composition described in this Patent Document 1 is not sufficient in cold resistance and ozone resistance. Therefore, further improvement has been sought.

RELATED ART

Patent Documents

Patent Document 1: Japanese Patent Publication No. 2007-277341A

SUMMARY OF THE INVENTION

Problem to be Solved by the Invention

The present invention was made in consideration of such an actual situation and has as its object the provision of a nitrile copolymer rubber composition able to give a cross-linked rubber excellent in cold resistance, ozone resistance, oil resistance, and compression set and a cross-linkable rubber composition and a cross-linked rubber obtained using that nitrile copolymer rubber composition.

Means for Solving the Problem

The present inventors engaged in intensive research to achieve the above object and as a result discovered that the above object can be achieved by a rubber composition comprising a nitrile copolymer rubber containing α,β-ethylenically unsaturated nitrile monomer units in a ratio of 22 to 45 wt % into which a vinyl chloride resin having an average polymerization degree of 1200 to 2200 is blended in a predetermined ratio and thereby completed the present invention.

That is, according to the present invention, there is provided a nitrile copolymer rubber composition comprising a nitrile copolymer rubber (A) containing 22 to 45 wt % of α,β-ethylenically unsaturated nitrile monomer units and a vinyl chloride resin (B) having an average polymerization degree of 1200 to 2200, wherein a ratio of content of the vinyl chloride resin (B) with respect to 100 parts by weight of the nitrile copolymer rubber (A) is 70 to 140 parts by weight.

In the nitrile copolymer rubber composition of the present invention, preferably when an average polymerization degree of the vinyl chloride resin (B) is defined as $\alpha$ and a ratio of content of the vinyl chloride resin (B) with respect to 100 parts by weight of the nitrile copolymer rubber (A) is defined as $\beta$ parts by weight, the product ($\alpha \times \beta$) of the average polymerization degree $\alpha$ of the vinyl chloride resin (B) and the ratio of content $\beta$ of the vinyl chloride resin (B) is 100,000 or more, and, when a ratio of content of the α,β-ethylenically unsaturated nitrile monomer units in the nitrile copolymer rubber (A) is defined as $\gamma$ wt %, the ratio (($\alpha \times \beta / \gamma$) of the product ($\alpha \times \beta$) and the ratio of content $\gamma$ of the α,β-ethylenically unsaturated nitrile monomer units is 3,000 to 6,000.

The nitrile copolymer rubber composition of the present invention preferably further comprises a liquid nitrile rubber (C).

In the nitrile copolymer rubber composition of the present invention, preferably a ratio of content of the liquid nitrile rubber (C) with respect to 100 parts by weight of the nitrile copolymer rubber (A) is 5 to 50 parts by weight.

The nitrile copolymer rubber composition of the present invention preferably further comprises a plasticizer, and the plasticizer is preferably an ester compound of a dibasic acid and an ether bond-containing alcohol.

Further, according to the present invention, there is provided a cross-linkable rubber composition obtained by blending a cross-linking agent into the above nitrile copolymer rubber composition.

Furthermore, according to the present invention, there is provided cross-linked rubber obtained by cross-linking the above cross-linkable rubber composition. The cross-linked rubber of the present invention preferably has a brittle temperature of −30° C. or less.

Effects of Invention

According to the present invention, it is possible to provide a nitrile copolymer rubber composition able to give cross-linked rubber excellent in cold resistance, ozone resistance, oil resistance, and compression set and a cross-linked rubber obtained using such a nitrile copolymer rubber composition and excellent in cold resistance, ozone resistance, oil resistance, and compression set.

DESCRIPTION OF EMBODIMENTS

Nitrile Copolymer Rubber Composition

The nitrile copolymer rubber composition of the present invention is a composition of a nitrile copolymer rubber comprising a nitrile copolymer rubber (A) containing 22 to 45 wt % of α,β-ethylenically unsaturated nitrile monomer units and a vinyl chloride resin (B) having an average polymerization degree of 1200 to 2200, wherein a ratio of content of the vinyl chloride resin (B) with respect to 100 parts by weight of the nitrile copolymer rubber (A) is 70 to 140 parts by weight.

Nitrile Copolymer Rubber (A)

The nitrile copolymer rubber (A) used in the present invention is a rubber containing at least α,β-ethylenically unsaturated nitrile monomer units in a ratio of 22 to 45 wt % and has a solid state at 25° C. (does not have fluidity at 25° C.).

The ratio of content of the α,β-ethylenically unsaturated nitrile monomer units is 22 to 45 wt % with respect to the total monomer units, preferably 26 to 40 wt %, more preferably 30 to 36 wt %. If the ratio of content of the α,β-ethylenically unsaturated nitrile monomer units is too low, the obtained cross-linked rubber ends up deteriorating in oil resistance. On the other hand, if the ratio of content is too high, the obtained cross-linked rubber ends up deteriorating in cold resistance.

Note that, in the present invention, when using as the nitrile copolymer rubber (A) a combination of rubbers with different monomer compositions, it is sufficient to make the ratio of content of the α,β-ethylenically unsaturated nitrile monomer units in the mixture of the rubbers with different monomer compositions as a whole (that is, the mixture of the nitrile copolymer rubbers (A) with different monomer compositions which have a solid state at 25° C. as a whole) the above range. For example, when using as the nitrile copolymer rubber (A) a mixture of a rubber (α) having a ratio of content of α,β-ethylenically unsaturated nitrile monomer units of 25 wt % and a rubber (β) having a ratio of 35 wt % in 50:50 (weight ratio), the ratio of content of the α,β-ethylenically unsaturated nitrile monomer units in the nitrile copolymer rubber (A) as a whole becomes 30 wt %. The same is true below for a diene monomer units or α-olefin monomer units etc.

The α,β-ethylenically unsaturated nitrile monomer forming the α,β-ethylenically unsaturated nitrile monomer units is not particularly limited so long as an α,β-ethylenically unsaturated compound having a nitrile group, but, for example, acrylonitrile; an α-halogenoacrylonitrile such as α-chloroacrylonitrile and α-bromoacrylonitrile; an α-alkylacrylonitrile such as methacrylonitrile; etc. may be mentioned. Among these as well, acrylonitrile and methacrylonitrile are preferable, these may be used as single types alone or as a plurality of types combined.

Further, the nitrile copolymer rubber (A) used in the present invention preferably contains diene monomer units or α-olefin monomer units since the obtained cross-linked rubber becomes one having rubber elasticity.

As the diene monomer, preferably a conjugated diene having 4 or more carbon atoms such as 1,3-butadiene, isoprene, 2,3-dimethyl-1,3-butadiene, and 1,3-pentadiene; and a nonconjugated diene having 5 to 12 carbon atoms such as 1,4-pentadiene, 1,4-hexadiene, vinylnorbornene, and dicyclopentadiene; may be mentioned. Among these, a conjugated diene is preferable, while 1,3-butadiene is more preferable.

The α-olefin monomer is preferably one having 2 to 12 carbon atoms. Ethylene, propylene, 1-butene, 4-methyl-1-pentene, 1-hexene, 1-octene, etc. may be illustrated.

The ratio of content of the diene monomer units or α-olefin monomer units in the nitrile copolymer rubber (A) is preferably 55 to 78 wt % with respect to the total monomer units, more preferably 60 to 74 wt %, still more preferably 61 to 74 wt %, further still more preferably 64 to 70 wt %. By making the ratio of content of the diene monomer units or α-olefin monomer units the above range, the rubber elasticity of the obtained cross-linked rubber can be suitably improved, while being excellent in cold resistance, ozone resistance, oil resistance, and compression set.

Further, the nitrile copolymer rubber (A) used in the present invention may contain, in addition to the above α,β-ethylenically unsaturated nitrile monomer units and diene monomer units or α-olefin monomer units, units of other monomers copolymerizable with the monomers forming these monomer units. The ratio of content of such other monomer units is preferably 30 wt % or less with respect to the total monomer units, more preferably 20 wt % or less, still more preferably 10 wt % or less.

As the other copolymerizable monomers, for example, aromatic vinyl compounds such as styrene, α-methylstyrene, and vinyltoluene; fluorine-containing vinyl compounds such as fluoroethylvinyl ether, fluoropropylvinyl ether, o-trifluoromethylstyrene, vinyl pentafluorobenzoate, difluoroethylene, and tetrafluoroethylene; α,β-ethylenically unsaturated carboxylic acids and their anhydrides such as acrylic acid, methacrylic acid, maleic acid, maleic anhydride, itaconic acid, itaconic anhydride, fumaric acid, and fumaric anhydride; alkyl esters of α,β-ethylenically unsaturated monocarboxylic acid such as methyl(meth)acrylate, ethyl(meth)acrylate, butyl(meth)acrylate, and 2-ethylhexyl (meth)acrylate; monoesters and diesters of α,β-ethylenically unsaturated polyvalent carboxylic acid such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate; alkoxyalkyl esters of α,β-ethylenically unsaturated carboxylic acid such as methoxyethyl(meth)acrylate, methoxypropyl(meth)acrylate, and butoxyethyl(meth)acrylate; hydroxyalkyl esters of α,β-ethylenically unsaturated carboxylic acid such as 2-hydroxyethyl(meth)acrylate and 3-hydroxypropyl(meth)acrylate; divinyl compounds such as divinylbenzene; di(meth) acrylic acid esters such as ethylene di(meth)acrylate, diethyleneglycol di(meth)acrylate, and ethyleneglycol di(meth)acrylate; trimethacrylic acid esters such as trimethylolpropane tri(meth)acrylate; and other polyfunctional ethylenically unsaturated monomers and also self cross-linkable compounds such as N-methylol(meth)acrylamide and N,N'-dimethylol(meth)acrylamide; etc. may be mentioned.

The Mooney viscosity (ML1+4, 100° C.) of the nitrile copolymer rubber (A) is usually 3 to 250, preferably 15 to 180, more preferably 20 to 160. If the polymer Mooney viscosity of the nitrile copolymer rubber (A) is too low, the strength characteristics of the obtained cross-linked rubber are liable to fall. On the other hand, if the polymer Mooney viscosity is too high, the processability may deteriorate. Note that, the Mooney viscosity of the nitrile copolymer rubber (A) can, for example, be measured based on JIS K6300.

The nitrile copolymer rubber (A) used in the present invention is not particularly limited in method of production, but can be produced by copolymerizing the above-mentioned monomers and, in accordance with need, hydrogenating the carbon-carbon double bonds in the obtained copolymer. The polymerization method is not particularly limited, but the known emulsion polymerization method or solution polymerization method may be used, but from the viewpoint of the industrial productivity, the emulsion polymerization method is preferable. At the time of emulsion polymerization, an emulsifier, polymerization initiator, and molecular weight adjuster and also ordinarily used polymerization secondary materials can be used.

The emulsifier is not particularly limited, but, for example, nonionic emulsifiers such as a polyoxyethylenealkyl ether, polyoxyethylenealkylphenol ether, polyoxyethylenealkyl ester, and polyoxyethylenesorbitanalkyl ester; anionic emulsifiers such as salts of fatty acids such as myristic acid, palmitic acid, oleic acid, and linolenic acid, an alkylbenzene sulfonate such as sodium dodecylbenzenesulfonate, a higher alcohol sulfuric acid ester salt, and alkylsulfosuccinic acid salt; a copolymerizable emulsifier such as a sulfo ester of an α,β-unsaturated carboxylic acid, a sulfate ester of an α,β-unsaturated carboxylic acid, and a sulfoalkylaryl ether; etc. may be mentioned. The amount of addition of the emulsifier is preferably 0.1 to 10 parts by weight with respect to 100 parts by weight of the monomers used for the polymerization, more preferably 0.5 to 5 parts by weight.

The polymerization initiator is not particularly limited so long as a radical initiator, but inorganic peroxides such as potassium persulfate, sodium persulfate, ammonium persulfate, potassium perphosphate, and hydrogen peroxide; organic peroxides such as t-butyl peroxide, cumen hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butylperoxyisobutyrate; azo compounds such as azobisisobutyronitrile, azobis-2,4-dimethylvaleronitrile, azobiscyclohexanecarbonitrile, and methyl azobisisobutyrate; etc. may be mentioned. These polymerization initiators can be used independently or as two types or more combined. As the polymerization initiator, an inorganic or organic peroxide is preferable. When using a polymerization initiator comprised of a peroxide, it may be combined with a reducing agent such as sodium bisulfate and ferrous sulfate as a redox type polymerization initiator. The amount of addition of polymerization initiator is preferably 0.01 to 2 parts by weight with respect to 100 parts by weight of the monomers used for the polymerization.

For the medium of the emulsion polymerization, usually water is used. The amount of the water is preferably 80 to 500 parts by weight with respect to 100 parts by weight of the monomers used for the polymerization, more preferably 80 to 300 parts by weight.

At the time of the emulsion polymerization, furthermore, in accordance with need, a polymerization secondary material such as a stabilizer, dispersant, pH adjuster, deoxidizer, and particle size adjuster can be used. In the case of using these, the type and amount of use are not particularly limited.

Further, the nitrile copolymer rubber (A) used in the present invention may be a hydrogenated nitrile copolymer rubber obtained by hydrogenating (hydrogenation reaction) at least part of the unsaturated bond parts of the diene monomer units of the copolymer obtained by copolymerization in the above way. The method of hydrogenation is not particularly limited, but a known method may be employed. If making the nitrile copolymer rubber (A) a hydrogenated nitrile copolymer rubber, the iodine value is preferably 0 to 70 in range, more preferably 4 to 60 in range.

Note that, when using the nitrile copolymer niter composition of the present invention to obtain the later explained cross-linkable rubber composition, in accordance with the compounding agents etc. used when obtaining the cross-linkable rubber composition, in addition to the nitrile copolymer rubber (A) to be included in the nitrile copolymer rubber composition of the present invention, it is also possible to additionally add the nitrile copolymer rubber (A) together with a cross-linking agent etc. when obtaining the cross-linkable rubber composition explained later.

Vinyl Chloride Resin (B)

The nitrile copolymer rubber composition of the present invention contains a vinyl chloride resin (B) having an average polymerization degree of 1200 to 2200 in addition to the above-mentioned nitrile copolymer rubber (A).

The vinyl chloride resin (B) is not particularly limited so long as a resin where the main component monomer is vinyl chloride and the average polymerization degree is 1200 to 2200 in range, but the content of the units of the main carponent monomer is preferably 50 to 100 wt %, more preferably 60 to 100 wt %, still more preferably 70 to 100 wt %.

Further, the average polymerization degree of the vinyl chloride resin (B) is 1200 to 2200, preferably 1250 to 2100, more preferably 1300 to 2000, still more preferably 1300 to 1900, further still more preferably 1400 to 1900. If the average polymerization degree is too low, the obtained cross-linked rubber ends up deteriorating in ozone resistance. On the other hand, if the average polymerization degree is too high, mixing with the nitrile copolymer rubber (A) becomes difficult, mixing with the nitrile copolymer rubber (A) becomes impossible, and the rubber composition can no longer be formed. Specifically, if the average polymerization degree is too high, polymer Mooney viscosity of the mixture becomes too high, due to this, mixing with the nitrile copolymer rubber (A) becomes difficult. Alternatively, if the average polymerization degree is too high, the melting point of the vinyl chloride resin (B) becomes too high, due to this, mixing with the nitrile copolymer rubber (A) in the melting state becomes difficult. As a result, mixing with the nitrile copolymer rubber (A) becomes impossible, and the rubber composition can no longer be formed. Note that, the vinyl chloride resin (B) can be measured for average polymerization degree by, for example, the solution viscosity method prescribed in JIS K6721. The glass transition temperature (Tg) of the vinyl chloride resin (B) is preferably 50 to 180° C.

Further, the vinyl chloride resin (B) used in the present invention may be one where in addition to the main component monomer comprised of the vinyl chloride, another monomer copolymerizable with vinyl chloride is copolymerized. As such another monomer, a (meth)acrylic acid alkyl ester having an alkyl group with 1 to 20 carbon atoms; an aromatic vinyl compound such as styrene, vinyltoluene, and α-methylstyrene; a vinyl cyanide compound such as acrylonitrile, methacrylonitrile, and vinylidene cyanide; a vinyl ester compound such as vinyl acetate and vinyl propionate; a vinyl ether compound such as ethyl vinyl ether, cetylvinyl ether, and hydxoxybutylvinyl ether; a hydroxy group- or alkoxy group-containing unsaturated carboxylic acid ester compound such as α-hydroxyethyl (meth)acrylate, 3-hydroxybutyl (meth)acrylate, and butoxyethyl (meth) acrylate; etc. may be mentioned.

The method of polymerization for producing the vinyl chloride resin (B) used in the present invention is not particularly limited. For example, emulsion polymerization, seeded emulsion polymerization, microsuspension polymerization, suspension polymerization, etc. may be mentioned.

In the nitrile copolymer rubber composition of the present invention, the content of the vinyl chloride resin (B) is 70 to 140 parts by weight with respect to 100 parts by weight of the nitrile copolymer rubber (A), preferably 75 to 135 parts by weight, more preferably 80 to 130 parts by weight. If the content of the vinyl chloride resin (B) is too small, the obtained cross-linked rubber ends up deteriorating in ozone resistance, while if too great, mixing with the nitrile copolymer rubber (A) becomes difficult, the processability sharply falls, the rubber composition can no longer be formed, and the cold resistance falls. Specifically, if the content of the vinyl chloride resin (B) is too great, polymer Mooney viscosity of the mixture becomes too high, due to this, mixing with the nitrile copolymer rubber (A) becomes difficult. As a result, the processability sharply falls, and the rubber composition can no longer be formed.

Further, in the present invention, when defining the average polymerization degree of the vinyl chloride resin (B) as "α" and the ratio of content of the vinyl chloride resin (B) with respect to 100 parts by weight of the nitrile copolymer rubber (A) β parts by weight, the product (α×β) of the average polymerization degree α of the vinyl chloride resin (B) and the ratio of content β of the vinyl chloride resin (B) is preferably made to become 100,000 or more. By the product (α×β) being made this range, the obtained cross-linked rubber can be raised more in ozone resistance. Further, the upper limit of the product (α×β) is usually 200,000 or less from the viewpoint of the kneadability with the nitrile copolymer rubber (A) and the cold resistance. The product (α×β) is preferably 105,000 to 195,000, more preferably 110,000 to 190,000, particularly preferably 120,000 to 180,000. Note that, for example, when the average polymerization degree of the vinyl chloride resin (B) is 1700 (α=1700) and the ratio of content of the vinyl chloride resin (B) with respect to 100 parts by weight of the nitrile copolymer rubber (A) is 82 parts by weight (β=82), the product (α×β) becomes 139,400 (=α×β=1700×82). According to the findings of the present inventors, the ozone resistance of the obtained cross-linked rubber is relatively greatly affected by the average polymerization degree of the vinyl chloride resin (B) and the ratio of content of the vinyl chloride resin (B). To this, by making the product (α×β) the above range, it is possible to improve the ozone resistance more.

Further, in the present invention, when defining the ratio of content of the α,β-ethylenically unsaturated nitrile monomer units in the nitrile copolymer rubber (A) as γ wt %, the ratio ((α×β)/γ) of the above-mentioned product (α×β) and the ratio of content γ of the α,β-ethylenically unsaturated nitrile monomer units is preferably made to become 3,000 to 6,000 in range. By making the ratio ((α×β)/γ) this range, the obtained cross-linked rubber can be further balancedly improved in cold resistance and oil resistance. The ratio ((α×β)/γ) is preferably 3,200 to 5,900, more preferably 3,400 to 5,800, particularly preferably 3,600 to 5,700. Note that, for example, when the average polymerization degree of the vinyl chloride resin (B) is 1700 (α=1700) and the ratio of content of the vinyl chloride resin (B) with respect to 100 parts by weight of the nitrile copolymer rubber (A) is 82 parts by weight (β=82) and the ratio of content of the α,β-ethylenically unsaturated nitrile monomer units in the nitrile copolymer rubber (A) is 30 wt % (γ=30), the ratio ((α×β)/γ) becomes 4,647 ((α×β/γ=(1700×82)/30). According to the findings of the present inventors, to better improve the cold resistance and oil resistance of the obtained cross-linked rubber, it is effective to determine the ratio of content of the α,β-ethylenically unsaturated nitrile monomer units in the nitrile copolymer rubber (A) in relation to the polymerization degree and ratio of content of the vinyl chloride resin (B). To this, by making the ratio of these ((α×β)/γ) the above range, it becomes possible to better improve the cold resistance and oil resistance.

Liquid Nitrile Rubber (C)

Further, the nitrile copolymer rubber composition of the present invention preferably contains, in addition to the above-mentioned nitrile copolymer rubber (A) and vinyl chloride resin (B), a liquid nitrile rubber (C). By containing the liquid nitrile rubber (C), the obtained cross-linked rubber can be better improved in ozone resistance.

The liquid nitrile rubber (C) used in the present invention is a nitrile copolymer rubber having a liquid state at 25° C. (having fluidity at 25° C.). The liquid nitrile rubber (C) used in the present invention, for example, has a Mooney viscosity measured based on JIS K6300 of usually 1 or less. Alternatively, the Mooney viscosity cannot be measured because the viscosity is too low.

The liquid nitrile rubber (C) used in the present invention is usually obtained by copolymerizing an α,β-ethylenically unsaturated nitrile monomer, a conjugated diene monomer, and another monomer copolymerizable with these used in accordance with need.

As the α,β-ethylenically unsaturated nitrile monomer, it is possible to use one same as the above-mentioned nitrile copolymer rubber (A). Acrylonitrile is preferable.

As the conjugated diene monomer, it is possible to use one same as the above-mentioned nitrile copolymer rubber (A). 1,3-butadiene is preferable.

Further, as the copolymerizable other monomer, it is possible to use one same as the above-mentioned nitrile copolymer rubber (A).

In the liquid nitrile rubber (C) used in the present invention, the ratio of content of the α,β-ethylenically unsaturated nitrile monomer units is preferably 10 to 60 wt % in the total monomer units, more preferably 20 to 50 wt %, still more preferably 25 to 40 wt %.

Further, in the liquid nitrile rubber (C), the ratio of content of the conjugated diene monomer units is preferably 40 to 90 wt % in the total monomer units, more preferably 50 to 80 wt %, still more preferably 60 to 75 wt %.

Furthermore, in the liquid nitrile rubber (C), the ratio of the content of the copolymerizable other monomer is preferably 30 wt % or less in the total monomer units, more preferably 20 wt % or less, particularly preferably 10 wt % or less.

Further, the liquid nitrile rubber (C) used in the present invention has a viscosity measured using a B-type viscometer at a temperature of 70° C. and speed of 10 rpm of preferably 1 to 30 Pa·s, more preferably 1 to 20 Pa·s, still more preferably 1 to 10 Pa·s, particularly preferably 3 to 9 Pa·s. Further, the liquid nitrile rubber (C) used in the present invention has a weight average molecular weight converted to polystyrene using gel permeation chromatography of preferably 1,000 to 100,000, more preferably 3,000 to 50,000, still more preferably 3,000 to 30,000, particularly preferably 3,000 to 15,000.

The method of production of the liquid nitrile rubber (C) used in the present invention is not particularly limited. A known method of production can be employed, but, for example, the method of using a large amount of a molecular weight adjuster, emulsion polymerizing the above monomers, and coagulating and heating to dry the result etc. may be mentioned. Further, as the liquid nitrile rubber (C), for example, a commercially available liquid nitrile rubber may also be used.

In the nitrile copolymer rubber composition of the present invention, the content of the liquid nitrile rubber (C) is preferably 5 to 50 parts by weight with respect to 100 parts by weight of the nitrile copolymer rubber (A), more preferably 10 to 45 parts by weight, still more preferably 15 to 40 parts by weight. By the content of the liquid nitrile rubber (C) being made the above range, it is possible to more suitably improve the effect of addition. Note that, when using the nitrile copolymer rubber composition of the present invention to obtain the later explained cross-linkable rubber composition, it is also possible to not mix in the liquid nitrile rubber (C) but to prepare the nitrile copolymer rubber composition of the present invention, then mix the liquid nitrile rubber (C) together with the cross-linking agent into the obtained nitrile copolymer rubber composition. Alternatively, the nitrile copolymer rubber composition of the present invention may be made to contain the liquid nitrile rubber (C), and the liquid nitrile rubber (C) may be further mixed with the nitrile copolymer rubber composition together with the cross-linking agent etc. when preparing the later explained cross-linkable rubber composition by mixing in a cross-linking agent etc.

Other Compounding Agents

Further, the nitrile copolymer rubber composition of the present invention may contain other compounding agents in addition to the above-mentioned nitrile copolymer rubber (A) and vinyl chloride resin (B) and the liquid nitrile rubber (C) used in accordance with need. As such another compounding agent, for example, a plasticizer, antiaging agent, stabilizer, etc. may be mentioned.

As specific examples of the plasticizer, for example, ester compounds of adipic acid and ether bond-containing alcohol such as dibutoxyethyl adipate and di(butoxyethoxyethyl) adipate; ester compounds of azelaic acid and ether bond-containing alcohol such as dibutoxyethyl azelate and di(butoxyethoxyethyl)azelate; ester compounds of sebacic acid and ether bond-containing alcohol such as dibutoxyethyl sebacate and di(butoxyethoxyethyl)sebacate; ester compounds of phthalic acid and ether bond-containing alcohol such as dibutoxyethyl phthalate and di(butoxyethoxyethyl) phthalate; ester compounds of isophthalic acid and ether bond-containing alcohol such as dibutoxyethyl isophthalate and di(butoxyethoxyethyl)isophthalate; adipic acid dialkyl esters such as di-(2-ethylhexyl)adipate, diisodecyl adipate, diisononyl adipate, and dibutyl adipate; azelaic acid dialkyl esters such as di-(2-ethylhexyl) azelate, diisooctyl azelate, and di-n-hexyl azelate; sebacic acid dialkyl esters such as di-n-butyl sebacate and di-(2-ethylhexyl) sebacate; phthalic acid dialkyl esters such as dibutyl phthalate, di-(2-ethylhexyl)phthalate, di-n-octyl phthalate, diisobutyl phthalate, diheptyl phthalate, diisodecyl phthalate, diundecyl phthalate, diisononyl phthalate; phthalic acid dicycloalkyl esters such as dicyclohexyl phthalate; phthalic acid aryl esters such as diphenyl phthalate and butylbenzyl phthalate; isophthalic acid dialkyl esters such as di-(2-ethylhexyl) isophthalate and diisooctyl isophthalate; tetrahydrophthalic acid dialkyl esters such as di-(2-ethylhexyl) tetrahydrophthalate, di-n-octyl tetrahydrophthalate, and diisodecyl tetrahydrophthalate; trimellitic acid derivatives such as tri-(2-ethylhexyl) trimellitate, tri-n-octyl trimellitate, triisodecyl trimellitate, triisooctyl trimellitate, tri-n-hexyl trimellitate, triisononyl trimellitate, and triisodecyl trimellitate; epoxy-based plasticizers such as epoxylated soybean oil and epoxylated linseed oil; phosphoric acid ester-based plasticizers such as tricresyl phosphate; etc. may be mentioned. These may be used as single types alone or as a plurality of types combined.

Among these as well, from the viewpoint of being able to better improve the cold resistance and oil resistance of the obtained cross-linked rubber, an ester compound of a dibasic acid such as adipic acid, azelaic acid, sebacic acid, and phthalic acid and an ether bond-containing alcohol is preferable, an ester compound of adipic acid and an ether bond-containing alcohol is more preferable, and di(butoxyethoxyethyl)adipate is particularly preferable.

In the nitrile copolymer rubber composition of the present invention, the content of the plasticizer is preferably 3 to 100 parts by weight with respect to 100 parts by weight of the nitrile copolymer rubber (A), more preferably 5 to 80 parts by weight, still more preferably 10 to 60 parts by weight. By making the content of the plasticizer the above range, it is possible to better improve the effect of addition.

The antiaging agent is not particularly limited, but an antiaging agent such as a phenol-based, amine based, benzimidazole-based, and phosphoric acid-based one can be used. In the nitrile copolymer rubber composition of the present invention, the content of the antiaging agent is preferably 0.5 to 20 parts by weight with respect to 100 parts by weight of the nitrile copolymer rubber (A), more preferably 1 to 15 parts by weight, still more preferably 1.5 to 10 parts by weight.

The nitrile copolymer rubber composition of the present invention is prepared by mixing ingredients containing the nitrile copolymer rubber (A) and vinyl chloride resin (B) in preferably a nonaqueous system. The mixing may, for example, be performed using a mixing machine such as a Bambury mixer, internal mixer, or kneader. At this time, when mixing the ingredients containing the nitrile copolymer rubber (A) and vinyl chloride resin (B), the mixing temperature is not particularly limited, but mixing at a temperature of the melting point of the vinyl chloride resin (B) or more is preferable, mixing at a temperature 5° C. or more higher than the melting point of the vinyl chloride resin (B) is more preferable, and mixing at a temperature 10° C. or more higher than the melting point of the vinyl chloride resin (B) is still more preferable. Specifically, mixing at 160° C. or more is preferable, mixing at 165° C. or more is more preferable, and mixing at 170° C. or more is still more preferable. By mixing at such a temperature, it is possible to better improve the dispersion of the vinyl chloride resin (B) in the nitrile copolymer rubber composition and thereby possible to better improve the obtained cross-linked rubber in ozone resistance.

Alternatively, the nitrile copolymer rubber composition of the present invention may be prepared by mixing the ingredients including the nitrile copolymer rubber (A) and vinyl chloride resin (B) in an aqueous system. In such a case, it may be prepared by mixing into the latex of the nitrile copolymer rubber (A) obtained by the emulsion polymerization the vinyl chloride resin (B) in the latex state produced by the emulsion polymerization method or suspension polymerization method known since the past and other ingredients (latex blend).

Cross-Linkable Rubber Composition

The cross-linkable rubber composition of the present invention is obtained by blending a cross-linking agent into the above-mentioned nitrile copolymer rubber composition of the present invention. As the cross-linking agent, a sulfur-based cross-linking agent, organic peroxide cross-linking agent, etc. may be mentioned. These may be used as single types alone or as a plurality of types combined, but using a sulfur-based cross-linking agent is preferable.

As the sulfur-based cross-linking agent, sulfur such as powdered sulfur, flowers of sulfur, precipitated sulfur, colloidal sulfur, surface-treated sulfur, and insoluble sulfur; sulfur-containing compounds such as sulfur chloride, sulfur dichloride, morpholine disulfide, alkylphenol disulfide, dibenzothiazyl disulfide, caprolactamdisulfide, phosphorus-containing polysulfide, and high molecular polysulfide; sulfur donor compounds such as tetramethylthiuram disulfide, selenium dimethyldithiocarbamate, and 2-(4'-morpholinodithio)benzothiazole; etc. may be mentioned. These may be used as single types alone or as a plurality of types combined.

As the organic peroxide cross-linking agent, dicumyl peroxide, cumen hydroperoxide, t-butylcumyl peroxide, p-menthane hydroperoxide, di-t-butyl peroxide, 1,3-bis(t-butylperoxyisopropyl)benzene, 1,4-bis(t-butylperoxyisopropyl) benzene, 1,1-di-t-butylperoxy-3,3-trimethylcyclohexane, 4,4-bis-(t-butyl-peroxy)-n-butyl valerate, 2,5-dimethyl-2,5-di-t-butylperoxyhexane, 2,5-dimethyl-2,5-di-t-butylperoxyhexine-3, 1,1-di-t-butylperoxy-3,5,5-trimethylcyclohexane, p-chlorobenzoyl peroxide, t-butylperoxyisopropyl carbonate, t-butylperoxybenzoate etc. may be mentioned. These may be used as single types alone or as a plurality of types combined.

In the cross-linkable rubber composition of the present invention, the content of the cross-linking agent is preferably 0.1 to 10 parts by weight with respect to 100 parts by weight of the nitrile copolymer rubber (A), more preferably 0.3 to 8 parts by weight, still more preferably 0.5 to 6 parts by weight, from the viewpoint of obtaining good cross-linked rubber.

When using a sulfur-based cross-linking agent, a cross-linking aid such as activated zinc oxide, zinc oxide, and stearic acid; a cross-linking accelerator such as a guanidine-based, aldehyde-amine-based, aldehyde-ammonia-based, thiazole-based, sulfenamide-based, and thiourea-based one; may be used together. The amount of use of cross-linking aid and cross-linking accelerator is preferably 0.1 to 20 parts by weight in range with respect to 100 parts by weight of the nitrile copolymer rubber (A).

When using an organic peroxide cross-linking agent, as the cross-linking aid, a polyfunctional monomer such as trimethylolpropane trimethacrylate, divinylbenzene, ethylene dimethacrylate, and triallyl isocyanurate etc. may be jointly used. The amount of use of cross-linking aid is preferably 0.5 to 20 parts by weight in range with respect to 100 parts by weight of the nitrile copolymer rubber (A).

Further, the cross-linkable rubber composition of the present invention preferably further contains an aromatic amine-based antiaging agent and/or quinoline-based antiaging agent, more preferably contains at least an aromatic amine-based antiaging agent, particularly preferably contains both an aromatic amine-based antiaging agent and quinoline-based antiaging agent. By further containing the aromatic amine-based antiaging agent and/or quinoline-based antiaging agent, the obtained cross-linked rubber can be better improved in ozone resistance.

As specific examples of the aromatic amine-based antiaging agent, diaryl secondary monoamine-based antiagent agents such as 4,4'-bis(α,α'-dimethylbenzyl)diphenylamine (also referred to as "p,p'-dicumyldiphenylamine"), p,p'-dioctyldiphenylamine and other octylated diphenylamines, styrenated diphenylamine, and phenyl-α-naphthylamine; diaryl-p-phenylenediamine-based antiaging agents such as diphenyl-p-phenylenediamine, mixed diaryl-p-phenylenediamine, and dinaphthyl-p-phenylenediamine; alkylaryl-p-phenylenediamine-based antiaging agents such as N-isopropyl-N'-phenyl-p-phenylenediamine, N-1,3-dimethylbutyl-N'-phenyl-p-phenylenediamine, N-(3-methacryloyloxy-2-hydroxypropyl)-N'-phenyl-p-phenylene diamine, N-(methacryloyl)-N'-phenyl-p-phenylenediamine; etc. may be mentioned. These may be used as single types alone or as a plurality of types combined. Among these as well, alkylaryl-p-phenylenediamine-based antiaging agents are preferable, while N-isopropyl-N'-phenyl-p-phenylenediamine is more preferable.

As the quinoline-based antiaging agent, 2,2,4-trimethyl-1,2-dihydroquinoline polymer, 6-ethoxy-2,2,4-trimethyl-1,2-dihydroquinoline polymer, etc. may be mentioned. These may be used as single types alone or as a plurality of types combined. Among these as well, 2,2,4-trimethyl-1,2-dihydroquinoline polymer is preferable.

In the cross-linkable rubber composition of the present invention, the content of the aromatic amine-based antiaging agent and/or quinoline-based antiaging agent is preferably 0.3 to 15 parts by weight with respect to 100 parts by weight of the nitrile copolymer rubber (A), more preferably 0.5 to 12 parts by weight, still more preferably 0.8 to 10 parts by weight. By making the content of the aromatic amine-based antiaging agent and/or quinoline-based antiaging agent the above range, the obtained cross-linked rubber can be more suitably improved in ozone resistance.

Further, the cross-linkable rubber composition of the present invention preferably further contains a hydrocarbon-based wax. By further containing a hydrocarbon-based wax, the obtained cross-linked rubber can be better improved in ozone resistance.

As the hydrocarbon-based wax, polyolefin waxes such as polyethylene wax and polypropylene wax; Fischer-Tropsch waxes; petroleum-based waxes such as paraffin wax and microcrystalline wax; etc. may be mentioned. Among these as well, Fischer-Tropsch waxes and petroleum-based waxes are preferable, while petroleum-based waxes are more preferable.

In the cross-linkable rubber composition of the present invention, the content of the hydrocarbon-based wax is preferably 0.1 to 5 parts by weight with respect to 100 parts by weight of the nitrile copolymer rubber (A), more preferably 0.3 to 4 parts by weight, still more preferably 0.5 to 3 parts by weight. By making the content of the aromatic hydrocarbon-based wax the above range, the obtained cross-linked rubber can be more suitably improved in ozone resistance.

Further, the cross-linkable rubber composition of the present invention preferably contains a plasticizer. As the plasticizer, one same as the above-mentioned nitrile copolymer rubber composition can be used. In the cross-linkable rubber composition of the present invention, the content of the plasticizer is preferably 3 to 300 parts by weight with respect to 100 parts by weight of the nitrile copolymer rubber (A), more preferably 5 to 200 parts by weight, still more preferably 10 to 150 parts by weight. By making the content of the plasticizer the above range, it is possible to better improve the effect of addition. Note that, the content of the plasticizer in the cross-linkable rubber composition of the present invention may be adjusted so that the content of the total with the plasticizer included in the above-mentioned nitrile copolymer rubber composition of the present invention becomes the above range.

Further, the cross-linkable rubber composition of the present invention may have further mixed into it, according to need, compounding agents used in general rubber, for example, additives such as a cross-linking retarder, reinforcing agent, filler, slip agent, tackifier, lubricant, processing aid, flame retardant, antifungal agent, antistatic agent, coloring agent, and coupling agent may be mixed in.

Further, the cross-linkable rubber composition of the present invention may also contain, in a range where the advantageous effect of the present invention is not impaired, a rubber other than the nitrile copolymer rubber (A) and liquid nitrile rubber (C). As the rubber other than the nitrile copolymer rubber (A) and liquid nitrile rubber (C), acrylic rubber, ethylene-acrylic acid copolymer rubber, fluororubber, styrene-butadiene copolymer rubber, polybutadiene rubber, ethylene-propylene copolymer rubber, ethylene-propylene-diene ternary copolymer rubber, epichlorohydrin rubber, urethane rubber, chloroprene rubber, silicone rubber, fluorosilicone rubber, chlorosulfonated polyethylenerubber, natural rubber, and polyisoprene rubber etc. may be mentioned. The amount in the case of mixing in a rubber other than the nitrile copolymer rubber (A) and liquid nitrile rubber (C) is preferably 30 parts by weight or less with respect to 100 parts by weight of the total of the nitrile copolymer rubber (A) and liquid nitrile rubber (C), 20 parts by weight or less is more preferable, 10 parts by weight or less is particularly preferable.

The method of preparation of the cross-linkable rubber composition of the present invention is not particularly limited, but it is sufficient to add the cross-linking agent and other compounding agents into the nitrile copolymer rubber composition obtained by the above method and then knead these by rolls, a Bambury mixer, or kneader, etc.

Note that, in this case, the order of mixing is not particularly limited, but it is suitable to sufficiently mix the ingredients resistant to reaction or breakdown due to heat, then mix in the ingredients susceptible to breakdown due to heat (cross-linking agent, cross-linking accelerator, etc.) in a short time at a temperature where such breakdown does not occur.

Cross-Linked Rubber

The cross-linked rubber of the present invention is obtained by cross-linking the cross-linkable rubber composition of the present invention explained above.

When cross-linking the cross-linkable rubber composition, it is formed by a forming machine corresponding to the shape of the product to be produced (cross-linked rubber), for example, an extruder, injection molding machine, press, rolls, etc. and then made to undergo a cross-linking reaction to thereby fix the shape of the cross-linked product. At the time of cross-linking, the composition can be formed in advance, then cross-linked or may be formed and simultaneously cross-linked. The forming temperature is usually 10 to 200° C., preferably 25 to 120° C. The cross-linking temperature is usually 100 to 200° C., preferably is 130 to 190° C., while the cross-linking time is usually 1 minute to 24 hours, preferably 2 minutes to 1 hour.

The cross-linked rubber sometimes may be cross-linked at its surface, but not sufficiently cross-linked at its inside depending upon its shape, size, etc., so may be further heated for secondary cross-linking.

The thus obtained cross-linked rubber of the present invention is one obtained using the above-mentioned nitrile rubber composition and cross-linkable rubber composition of the present invention, so is excellent in cold resistance, ozone resistance, oil resistance, and compression set. In particular, the cross-linked rubber of the present invention preferably has a brittle temperature of −30° C. or less. Due to having a brittle temperature of −30° C. or less, it is possible to make it better in cold resistance. Note that, the method of making the brittle temperature of the cross-linked rubber −30° C. or less is not particularly limited, but, for example, the method of using a plasticizer comprised of the above-mentioned plasticizer (preferably, using an ester compound of a dibasic acid and an ether bond-containing alcohol, more preferably an ester compound of adipic acid and an ether bond-containing alcohol, still more preferably di(butoxyethoxyethyl)adipate) and making the amount preferably 3 to 100 parts by weight with respect to 100 parts by weight of the nitrile copolymer rubber (A), more preferably 5 to 80 parts by weight, still more preferably 10 to 60 parts by weight in range, etc. may be mentioned.

Further, in the cross-linked rubber of the present invention, regarding the ozone resistance, when the cross-linked rubber is tested for ozone resistance based on JIS K6259 by repeatedly stretching the cross-linked rubber by 0 to 20% during which exposing it to an atmosphere of an ozone concentration of 50 pphm and 40° C. as a dynamic ozone test, the time until the cross-linked rubber cracks is 72 hours or more and it is excellent in ozone resistance.

For this reason, the cross-linked rubber of the present invention is suitable for various seal members such as packings, gaskets, O-rings, and oil seals; hoses such as oil hoses, fuel hoses, inlet hoses, gas hoses, brake hoses, and coolant hoses; diaphragms; accumulator bladders; boots; etc., it is more preferably used as hoses, it is particularly preferably used as gas hoses for conveying air, nitrogen, oxygen, hydrogen, carbon dioxide, carbon monoxide, methane, ethane, propane, dimethyl ether, steam, etc., and it is particularly preferably used as hoses and tubes.

EXAMPLES

Below, examples and comparative examples will be given to more specifically explain the present invention, but the present invention is not limited to these examples. Below, unless otherwise indicated, "parts" are based on weight. The tests and methods of evaluation of the physical properties and characteristics were as follows.

Mooney Viscosity (Polymer Mooney)

The Mooney viscosity of the nitrile copolymer rubber (polymer Mooney) was measured in accordance with JIS K6300 (units: ML1+4, 100° C.).

Brittle Temperature (Cold Resistance)

A cross-linkable rubber composition was placed in a vertical 15 cm, horizontal 15 cm, depth 0.2 cm mold and pressed while press-forming it at 160° C. for 15 minutes to obtain a sheet-shaped cross-linked rubber. Using the obtained sheet-shaped cross-linked rubber, in accordance with JIS K6261, the brittle temperature was measured. The lower the brittle temperature, it is judged the better the cold resistance.

Dynamic Ozone Test (Ozone Resistance)

Using a test piece similar to the sheet-shaped cross-linked rubber used for measurement of the brittle temperature above, based on JIS K6259, the test piece was repeatedly stretched 0 to 20% during which it was exposed to an atmosphere of an ozone concentration of 50 pphm and 40° C. The state of cracking of the test piece along with the elapse of time was observed. Note that, the occurrence of cracking was checked every 24 hours. The last elapsed time up to which no cracking could be observed was defined as the cracking time (for example, when cracking could not be confirmed after 48 hours, but cracking occurred after 72 hours, the cracking time was deemed to be 48 hours). The longer the time until cracking, it is judged the better the ozone resistance.

Oil Resistance (Fuel Oil Resistance)

Using a test piece similar to the sheet shaped cross-linked rubber used for measurement of the brittle temperature above, in accordance with JIS K6258, the cross-linked rubber was immersed in a test fuel oil (Fuel-C) of isooctane/toluene=50/50 (volume ratio) under conditions of a temperature of 40° C. for 72 hours to test the oil resistance. Further, the volumes of the cross-linked rubber before and after immersion in the test fuel oil were measured and the change rate of volume ΔV (units: %) after the immersion was calculated in accordance with "change rate of volume ΔV=([volume after immersion−volume before immersion]/volume before immersion)×100" so as to evaluate the oil resistance. The smaller the absolute value of the change rate of volume ΔV, the smaller the degree of swelling due to the fuel oil and it is judged the better the oil resistance.

Compression Set

A cross-linkable rubber composition was pressed at a temperature of 160° C. for 20 minutes using a mold to cross-link it to obtain cross-linked rubber of a columnar shape of a diameter of 29 mm and a height of 12.5 mm. Using the columnar shaped cross-linked rubber, in accordance with JIS K6262, the cross-linked rubber was compressed 25%. In that state, it was allowed to stand in an environment of 100° C. for 70 hours, then was measured for compression set. The smaller the value, it is judged the better the compression set characteristic.

Production Example 1 (Production of Nitrile Copolymer Rubber (A-1))

To a reaction vessel, 240 parts of water, 28 parts of acrylonitrile, and 2.5 parts of sodium dodecylbenzenesulfonate (emulsifier) were charged, then the temperature was adjusted to 5° C. Next, the vapor phase was reduced in pressure to sufficiently degasify the vessel, then 72 parts of 1,3-butadiene, 0.04 part of a polymerization initiator comprised of p-menthane hydroperoxide, 0.02 part of sodium ethylenediaminetetraacetate, 0.006 part of ferrous sulfate (7-hydrate), 0.06 part of sodium formaldehyde sulfoxylate, and 1 part of a chain transfer agent comprised of t-dodecylmercaptan were added to start the first stage reaction of the emulsion polymerization. After that, when the polymerization conversion rate with respect to the total monomers which were charged reached 88 wt %, 0.3 part of hydroxylamine sulfate and 0.2 part of potassium hydroxide were added to make the polymerization reaction stop. After the reaction stopped, the content of the reaction vessel was warmed to 70° C. and steam distillation was performed under reduced pressure to recover the unreacted monomers and obtain a latex of the nitrile copolymer rubber (A-1) (solid content 26 wt %).

Next, to the obtained latex, two volumes of methanol were added to coagulate it, then the result was dried in vacuo at 60° C. for 12 hours to obtain the nitrile copolymer rubber (A-1). $^1$H-NMR was used to measure the obtained nitrile copolymer rubber (A-1) for the composition of monomer units. As a result, it was 29.0 wt % of acrylonitrile units and 71.0 wt % of 1,3-butadiene units. The polymer Mooney viscosity [ML1+4, 100° C.] was 78.

Production Example 2 (Production of Nitrile Copolymer Rubber (A-2))

Except for changing the charged monomers in the first stage reaction of the emulsion polymerization in Production Example 1 to 33 parts of acrylonitrile and 67 parts of 1,3-butadiene and making the polymerization reaction stop when the polymerization conversion rate reached 90 wt %, the same procedure was followed as in Production Example 1 to obtain a latex of the nitrile copolymer rubber (A-2) (solid content concentration 27 wt %).

Next, to the obtained latex, two volumes of methanol were added to coagulate it, then the result was dried in vacuo at 60° C. for 12 hours to obtain the nitrile copolymer rubber (A-2). $^1$H-NMR was used to measure the obtained nitrile copolymer rubber (A-2) for the composition of monomer units. As a result, it was 33.5 wt % of acrylonitrile units and 66.5 wt % of 1,3-butadiene units. The polymer Mooney viscosity [ML1+4, 100° C.] was 78.

Production Example 3 (Production of Nitrile Copolymer Rubber (A-3))

Except for changing the charged monomers in the first stage reaction of the emulsion polymerization in Production Example 1 to 37 parts of acrylonitrile and 63 parts of 1,3-butadiene and making the polymerization reaction stop when the polymerization conversion rate reached 90 wt %, the same procedure was followed as in Production Example 1 to obtain a latex of the nitrile copolymer rubber (A-3) (solid content concentration 27 wt %).

Next, to the obtained latex, two volumes of methanol were added to coagulate it, then the result was dried in vacuo at 60° C. for 12 hours to obtain the nitrile copolymer rubber (A-3). $^1$H-NMR was used to measure the obtained nitrile copolymer rubber (A-3) for the composition of monomer units. As a result, it was 40.5 wt % of acrylonitrile units and 59.5 wt % of 1,3-butadiene units. The polymer Mooney viscosity [ML1+4, 100° C.] was 80.

Production Example 4 (Production of Nitrile Copolymer Rubber (A-4))

Except for changing the charged monomers in the first stage reaction of the emulsion polymerization in Production Example 1 to 40 parts of acrylonitrile and 60 parts of 1,3-butadiene and making the polymerization reaction stop when the polymerization conversion rate reached 90 wt %, the same procedure was followed as in Production Example 1 to obtain a latex of the nitrile copolymer rubber (A-4) (solid content concentration 27 wt %).

Next, to the obtained latex, two volumes of methanol were added to coagulate it, then the result was dried in vacuo at 60° C. for 12 hours to obtain the nitrile copolymer rubber (A-4). $^1$H-NMR was used to measure the obtained nitrile copolymer rubber (A-4) for the composition of monomer units. As a result, it was 42.5 wt % of acrylonitrile units and 57.5 wt % of 1,3-butadiene units. The polymer Mooney viscosity [ML1+4, 100° C.] was 83.

Production Example 5 (Production of Nitrile Copolymer Rubber (A'-5))

Except for changing the charged monomers in the first stage reaction of the emulsion polymerization in Production Example 1 to 10 parts of acrylonitrile and 90 parts of 1,3-butadiene, additionally adding 5 parts and 5 parts of acrylonitrile to the reaction vessel to perform a second stage and third stage polymerization reaction when the polymerization conversion rate reached 30 wt % and 50 wt %, and making the polymerization reaction stop when the polymerization conversion rate reached 80 wt %, the same procedure was followed as in Production Example 1 to obtain a latex of the nitrile copolymer rubber (A'-5) (solid content concentration 26 wt %).

Next, to the obtained latex, two volumes of methanol were added to coagulate it, then the result was dried in vacuo at 60° C. for 12 hours to obtain the nitrile copolymer rubber (A'-5). $^1$H-NMR was used to measure the obtained nitrile copolymer rubber (A'-5) for the composition of monomer units. As a result, it was 18.0 wt % of acrylonitrile units and 82.0 wt % of 1,3-butadiene units. The polymer Mooney viscosity [ML1+4, 100° C.] was 78.

Production Example 6 (Production of Nitrile Copolymer Rubber (A'-6))

Except for changing the charged monomers in the first stage reaction of the emulsion polymerization in Production Example 1 to 48 parts of acrylonitrile and 52 parts of 1,3-butadiene and making the polymerization reaction stop when the polymerization conversion rate reached 90 wt %, the same procedure was followed as in Production Example 1 to obtain a latex of the nitrile copolymer rubber (A'-6) (solid content concentration 27 wt %).

Next, to the obtained latex, two volumes of methanol were added to coagulate it, then the result was dried in vacuo at 60° C. for 12 hours to obtain the nitrile copolymer rubber (A'-6). $^1$H-NMR was used to measure the obtained nitrile copolymer rubber (A'-6) for the composition of monomer units. As a result, it was 50.0 wt % of acrylonitrile units and 50.0 wt % of 1,3-butadiene units. The polymer Mooney viscosity [ML1+4, 100° C.] was 78.

Production Example 7 (Production of Liquid Nitrile Rubber (C-1))

To a reaction vessel, 240 parts of water, 33 parts of acrylonitrile, 67 parts of 1,3-butadiene, 3 parts of sodium dodecyl sulfate, and 0.5 part of potassium persulfate were charged. Further, 8 parts of a molecular weight adjuster comprised of t-dodecyl mercaptan was added and sufficiently stirred to make the mixture even while maintaining it at 30° C. When the polymerization conversion rate with respect to the total monomers which were charged reached 90 wt %, 0.1 part of hydroxylamine sulfate and 0.1 part of sodium hydroxide were added to make the polymerization reaction stop and the remaining monomers were removed by heating. The obtained polymer (liquid nitrile rubber (C-1)) had a number average molecular weight of 5000 and 29.5 wt % of acrylonitrile units.

Example 1

To 82 parts of the nitrile copolymer rubber (A-1) obtained in Production Example 1, 82 parts of the vinyl chloride resin (B-1) (average polymerization degree 1700), 20 parts of the liquid nitrile rubber (C-1) obtained in Production Example 7, and 33 parts of di(butoxyethoxyethyl)adipate (plasticizer) were added and kneaded by a Bambury mixer at 175° C. to obtain a nitrile copolymer rubber composition.

Next, to the above obtained nitrile copolymer rubber composition, 18 parts of acrylonitrile butadiene rubber (acrylonitrile units: 33.5 wt %, polymer Mooney viscosity [ML1+4, 100° C.]: 27, nitrile copolymer rubber (A)), 170 parts of MAF carbon, 5.5 parts of zinc oxide (activated zinc oxide), 1.8 parts of a mixture of solid paraffin and microcrystalline wax, 3.7 parts of 2,2,4-trimethyl-1,2-dihydroquinoline polymer (quinoline-based antiaging agent), 3.7 parts of N-isopropyl-N'-phenyl-p-phenylene diamine (aromatic amine-based antiaging agent), and 71 parts of di(butoxyethoxyethyl) adipate (plasticizer) were added and kneaded by a Bambury mixer at 140° C. to thereby obtain a rubber composition. Next, the obtained rubber composition was wraped around rolls which was warmed at 50° C., 2.7 parts of 325 mesh sulfur, 2.7 parts of di-2-benzothiazolyl disulfide (cross-linking accelerator), and 0.9 part of tetramethylthiuram disulfide (cross-linking accelerator) were added to the rubber composition and kneaded them by rolls to thereby obtain a cross-linkable rubber composition.

Further, using the obtained cross-linkable rubber composition, the brittle temperature (cold resistance), dynamic ozone test (ozone resistance), oil resistance (fuel oil resistance), and compression set were tested and evaluated. The results are shown in Table 1. Note that the amount of the acrylonitrile units of the nitrile copolymer rubber as a whole used in the present example (mixture of the nitrile copolymer rubber (A-1) and acrylonitrile butadiene rubber) was 29.8 wt %.

Example 2

Except for using 82 parts of the nitrile copolymer rubber (A-2) obtained in the Production Example 2 instead of 82 parts of the nitrile copolymer rubber (A-1) obtained in Production Example 1, the same procedure was followed as in Example 1 to obtain a nitrile copolymer rubber composition and cross-linkable rubber composition and the same procedures were followed to evaluate them. The results are shown in Table 1. Note that the amount of the acrylonitrile units of the nitrile copolymer rubber as a whole used in the present example (mixture of the nitrile copolymer rubber (A-2) and acrylonitrile butadiene rubber) was 33.5 wt % (same in Examples 4, 5, and 7 and Comparative Examples 3 to 6 as well).

Example 3

Except for using 82 parts of the nitrile copolymer rubber (A-3) obtained in the Production Example 3 instead of 82 parts of the nitrile copolymer rubber (A-1) obtained in Production Example 1, the same procedure was followed as in Example 1 to obtain a nitrile copolymer rubber composition and cross-linkable rubber composition and the same procedures were followed to evaluate them. The results are shown in Table 1. Note that the amount of the acrylonitrile units of the nitrile copolymer rubber as a whole used in the present example (mixture of the nitrile copolymer rubber (A-3) and acrylonitrile butadiene rubber) was 39.2 wt %.

Example 4

Except for changing the amount of the nitrile copolymer rubber (A-2) obtained in Production Example 2 to 78 parts, the amount of the vinyl chloride resin (B-1) to 117 parts, the amount of the liquid nitrile rubber (C-1) to 24 parts, and the amount of di(butoxyethoxyethyl)adipate to 39 parts, the same procedure was followed as in Example 2 to obtain a nitrile copolymer rubber composition.

Next, except for changing the amount of the acrylonitrile butadiene rubber (nitrile copolymer rubber (A)) with respect to the nitrile copolymer rubber composition obtained above to 22 parts, the amount of the di(butoxyethoxyethyl) adipate to 85 parts, and the amount of the MAF carbon to 200 parts, the same procedure was followed as in Example 2 to obtain the cross-linkable rubber composition and the same procedures were followed to evaluate it. The results are shown in Table 1.

Example 5

Except for using 82 parts of vinyl chloride resin (B-2) (average polymerization degree 2000) instead of 82 parts of vinyl chloride resin (B-1), the same procedure was followed as in Example 2 to obtain a nitrile copolymer rubber composition and cross-linkable rubber composition and the same procedures were followed to evaluate them. The results are shown in Table 1.

Example 6

Except for using 82 parts of the nitrile copolymer rubber (A-4) obtained in the Production Example 4 instead of 82 parts of the nitrile copolymer rubber (A-1) obtained in Production Example 1, the same procedure was followed as in Example 1 to obtain a nitrile copolymer rubber composition and cross-linkable rubber composition and the same procedures were followed to evaluate them. The results are shown in Table 1. Note that, the amount of acrylonitrile units of the nitrile copolymer rubber as a whole used in the present example (as mixture of nitrile copolymer rubber (A-4) and acrylonitrile butadiene rubber) was 40.9 wt %.

Example 7

Except for using 117 parts of vinyl chloride resin (B-3) (average polymerization degree 1300) instead of 117 parts of vinyl chloride resin (B-1), the same procedure was followed as in Example 4 to obtain a nitrile copolymer rubber composition and cross-linkable rubber composition and the same procedures were followed to evaluate them. The results are shown in Table 1.

Example 8

Except for changing the amount of the nitrile copolymer rubber (A-1) obtained in Production Example 1 to 41 pars, further using 41 parts of the nitrile copolymer rubber (A'-5) obtained in Production Example 5, and using 75 parts of vinyl chloride resin (B-3) (average polymerization degree 1300) instead of 82 parts of vinyl chloride resin (B-1), the same procedure was followed as in Example 1 to obtain a nitrile copolymer rubber composition and cross-linkable rubber composition and the same procedures were followed to evaluate them. The results are shown in Table 1. Note that the amount of the acrylonitrile units of the nitrile copolymer rubber as a whole used in the present example (mixture of the nitrile copolymer rubber (A-1), the nitrile copolymer rubber (A'-5) and acrylonitrile butadiene rubber) was 25.3 wt %.

Example 9

Except for using 82 parts of vinyl chloride resin (B-2) (average polymerization degree 2000) instead of 82 parts of vinyl chloride resin (B-1), the same procedure was followed as in Example 6 to obtain a nitrile copolymer rubber composition and cross-linkable rubber composition and the same procedures were followed to evaluate them. The results are shown in Table 1.

Example 10

Except for using 41 parts of the nitrile copolymer rubber (A-4) obtained in Production Example 4 and 41 parts of the nitrile copolymer rubber (A'-6) obtained in Production Example 6 instead of 78 parts of the nitrile copolymer rubber (A-2) obtained in Production Example 2, and changing the amount of the liquid nitrile rubber (C-1) to 20 parts, the amount of the vinyl chloride resin (B-3) to 82 parts, the amount of the acrylonitrile butadiene rubber (nitrile copolymer rubber (A)) to 18 parts, the same procedure was followed as in Example 7 to obtain a nitrile copolymer rubber composition and cross-linkable rubber composition and the same procedures were followed to evaluate them. The results are shown in Table 1. Note that the amount of the acrylonitrile units of the nitrile copolymer rubber as a whole used in the present example (mixture of the nitrile copolymer rubber (A-4), the nitrile copolymer rubber (A'-6) and acrylonitrile butadiene rubber) was 44.0 wt %.

Comparative Example 1

Except for using 82 parts of the nitrile copolymer rubber (A'-5) obtained in Production Example 5 instead of 82 parts of the nitrile copolymer rubber (A-1) obtained in Production Example 1, the same procedure was followed as in Example 1 to obtain a nitrile copolymer rubber composition and cross-linkable rubber composition and the same procedures were followed to evaluate them. The results are shown in Table 2. Note that, the amount of acrylonitrile units of the nitrile copolymer rubber as a whole used in the present example (as mixture of nitrile copolymer rubber (A'-5) and acrylonitrile butadiene rubber) was 20.8 wt %.

Comparative Example 2

Except for using 82 parts of the nitrile copolymer rubber (A'-6) obtained in Production Example 6 instead of 82 parts of the nitrile copolymer robber (A-1) obtained in Production Example 1, the same procedure was followed as in Example 1 to obtain a nitrile copolymer rubber composition and cross-linkable rubber composition and the same procedures were followed to evaluate them. The results are shown in Table 2. Note that, the amount of acrylonitrile units of the nitrile copolymer rubber as a whole used in the present example (as mixture of nitrile copolymer rubber (A'-6) and acrylonitrile butadiene rubber) was 47.0 wt %.

Comparative Example 3

Except for changing the amount of the vinyl chloride resin (B-1) from 82 parts to 55 parts, the amount of liquid nitrile rubber (C-1) obtained in Production Example 7 from 20 parts to 17 parts, and the amount of di(butoxyethoxyethyl) adipate from 33 parts to 27.0 parts, the same procedure was followed as in Example 2 to obtain a nitrile copolymer robber composition and cross-linkable rubber composition and the same procedure was followed to evaluate them. The results are shown in Table 2.

Comparative Example 4

Except for changing the amount of vinyl chloride resin (B-1) from 82 parts to 190 parts and the amount of di(butoxyethoxyethyl) adipate from 33 parts to 55 parts and not adding the liquid nitrile rubber (C1) obtained in Production Example 7, the same procedure was followed as in Example 2 to obtain a nitrile copolymer rubber composition. However, in Comparative Example 4, due to large amount of the vinyl chloride resin (B-1), polymer Mooney viscosity of the mixture became too high so that the processability remarkably falls, and mixing the nitrile copolymer rubber (A-2) and vinyl chloride resin (B-1) was difficult and a good composition could not be obtained.

Comparative Example 5

Except for using 82 parts of vinyl chloride resin (B-4) (average polymerization degree 1000) instead of 82 parts of vinyl chloride resin (B-1), the same procedure was followed as in Example 2 to obtain a nitrile copolymer rubber composition and cross-linkable rubber composition and the same procedure was followed to evaluate them. The results are shown in Table 2.

Comparative Example 6

Except for using 82 parts of vinyl chloride resin (B-5) (average polymerization degree 2500) instead of 82 parts of vinyl chloride resin (B-1), the same procedure was followed as in Example 2 to obtain a nitrile copolymer rubber composition. However, in Comparative Example 6, due to high in the average polymerization degree of the vinyl chloride resin (B-5), polymer Mooney viscosity of the mixture became too high so that the processability remarkably falls, and mixing the nitrile copolymer rubber (A-2) and vinyl chloride resin (B-5) was difficult and a good composition could not be obtained.

TABLE 1

| | Examples | | | | | | | | | |
|---|---|---|---|---|---|---|---|---|---|---|
| | 1 | 2 | 3 | 4 | 5 | 6 | 7 | 8 | 9 | 10 |
| Formulation of cross-linkable rubber composition | | | | | | | | | | |
| Nitrile copolymer rubber (A-1) (acrylonitrile units: 29.0 wt %) (parts) | 82 | | | | | | | 41 | | |
| Nitrile copolymer rubber (A-2) (acrylonitrile units: 33.5 wt %) (parts) | | 82 | | 78 | 82 | | 78 | | | |
| Nitrile copolymer rubber (A-3) (acrylonitrile units: 40.5 wt %) (parts) | | | 82 | | | | | | | |
| Nitrile copolymer rubber (A-4) (acrylonitrile units: 42.5 wt %) (parts) | | | | | | 82 | | | 82 | 41 |
| Nitrile copolymer rubber (A'-5) (acrylonitrile units: 18.0 wt %) (parts) | | | | | | | | 41 | | |
| Nitrile copolymer rubber (A'-6) (acrylonitrile units: 50.0 wt %) (parts) | | | | | | | | | | 41 |
| Liquid nitrile rubber (C-1) (parts) | 20 | 20 | 20 | 24 | 20 | 20 | 24 | 20 | 20 | 20 |
| Vinyl chloride resin (B-1) (average polymerization degree: 1700) (parts) | 82 | 82 | 82 | 117 | | 82 | | | | |
| Vinyl chloride resin (B-2) (average polymerization degree: 2000) (parts) | | | | | 82 | | | | 82 | |
| Vinyl chloride resin (B-3) (average polymerization degree: 1300) (parts) | | | | | | | 117 | 75 | | 82 |
| Vinyl chloride resin (B-4) (average polymerization degree: 1000) (parts) | | | | | | | | | | |
| Vinyl chloride resin (B-5) (average polymerization degree: 2500) (parts) | | | | | | | | | | |
| Nitrile copolymer rubber (A) (acrylonitrile units: 33.5 wt %) (parts) | 18 | 18 | 18 | 22 | 18 | 18 | 22 | 18 | 18 | 18 |
| Di(butoxyethoxyethyl)adipate (parts) | 104 | 104 | 104 | 124 | 104 | 104 | 124 | 104 | 104 | 124 |

TABLE 1-continued

Table 1

| | Examples | | | | | | | | | |
|---|---|---|---|---|---|---|---|---|---|---|
| | 1 | 2 | 3 | 4 | 5 | 6 | 7 | 8 | 9 | 10 |
| MAF carbon (parts) | 170 | 170 | 170 | 200 | 170 | 170 | 200 | 170 | 170 | 200 |
| Zinc oxide (parts) | 5.5 | 5.5 | 5.5 | 5.5 | 5.5 | 5.5 | 5.5 | 5.5 | 5.5 | 5.5 |
| Mixture of solid paraffin and microcrystalline wax (parts) | 1.8 | 1.8 | 1.8 | 1.8 | 1.8 | 1.8 | 1.8 | 1.8 | 1.8 | 1.8 |
| 2,2,4-trimethyl-1,2-dihydroquinoline polymer (parts) | 3.7 | 3.7 | 3.7 | 3.7 | 3.7 | 3.7 | 3.7 | 3.7 | 3.7 | 3.7 |
| N-isopropyl-N'-phenyl-p-phenylenediamine (parts) | 3.7 | 3.7 | 3.7 | 3.7 | 3.7 | 3.7 | 3.7 | 3.7 | 3.7 | 3.7 |
| Sulfur (parts) | 2.7 | 2.7 | 2.7 | 2.7 | 2.7 | 2.7 | 2.7 | 2.7 | 2.7 | 2.7 |
| Di-2-benzothiazolyl disulfide (parts) | 2.7 | 2.7 | 2.7 | 2.7 | 2.7 | 2.7 | 2.7 | 2.7 | 2.7 | 2.7 |
| Tetramethylthiuram disulfide (parts) | 0.9 | 0.9 | 0.9 | 0.9 | 0.9 | 0.9 | 0.9 | 0.9 | 0.9 | 0.9 |
| Amount of acrylonitrile units of nitrile copolymer rubber as a whole (wt %) | 29.8 | 33.5 | 39.2 | 33.5 | 33.5 | 40.9 | 33.5 | 25.3 | 40.9 | 44.0 |
| Product ($\alpha \times \beta$) | 139,400 | 139,400 | 139,400 | 195,500 | 164,000 | 139,400 | 152,100 | 97,500 | 164,000 | 106,600 |
| Ratio (($\alpha \times \beta$)/$\gamma$) | 4,678 | 4,161 | 3,556 | 5,836 | 4,896 | 3,408 | 4,540 | 3,854 | 4,010 | 2,423 |
| Evaluation | | | | | | | | | | |
| Brittle temperature (° C.) | −45 | −44 | −40 | −40 | −41 | −35 | −38 | −44 | −35 | −32 |
| Dynamic ozone test (cracking time) (h) | 72 | 72 | 72 | 96 | 96 | 72 | 72 | 48 | 96 | 48 |
| Oil resistance (Fuel-C) ($\Delta$ V) | +9 | +3 | +2 | +3 | +3 | +1 | +4 | +13 | +1 | +2 |
| Compression set (%) | 63 | 67 | 68 | 72 | 65 | 69 | 72 | 65 | 65 | 73 |

TABLE 2

Table 2

| | Comparative Examples | | | | | |
|---|---|---|---|---|---|---|
| | 1 | 2 | 3 | 4 | 5 | 6 |
| Formulation of cross-linkable rubber composition | | | | | | |
| Nitrile copolymer rubber (A-1) (acrylonitrile units: 29.0 wt %) (parts) | | | | | | |
| Nitrile copolymer rubber (A-2) (acrylonitrile units: 33.5 wt %) (parts) | | | 82 | 82 | 82 | 82 |
| Nitrile copolymer rubber (A-3) (acrylonitrile units: 40.5 wt %) (parts) | | | | | | |
| Nitrile copolymer rubber (A-4) (acrylonitrile units: 42.5 wt %) (parts) | | | | | | |
| Nitrile copolymer rubber (A'-5) (acrylonitrile units: 18.0 wt %) (parts) | 82 | | | | | |
| Nitrile copolymer rubber (A'-6) (acrylonitrile units: 50.0 wt %) (parts) | | 82 | | | | |
| Liquid nitrile rubber (C-1) (parts) | 20 | 20 | 17 | | 20 | 20 |
| Vinyl chloride resin (B-1) (average polymerization degree: 1700) (parts) | 82 | 82 | 55 | 190 | | |
| Vinyl chloride resin (B-2) (average polymerization degree: 2000) (parts) | | | | | | |
| Vinyl chloride resin (B-3) (average polymerization degree: 1300) (parts) | | | | | | |
| Vinyl chloride resin (B-4) (average polymerization degree: 1000) (parts) | | | | | 82 | |
| Vinyl chloride resin (B-5) (average polymerization degree: 2500) (parts) | | | | | | 82 |
| Nitrile copolymer rubber (A) (acrylonitrile units: 33.5 wt %) (parts) | 18 | 18 | 18 | 18 | 18 | 18 |
| Di(butoxyethoxyethyl)adipate (parts) | 104 | 104 | 98 | 126 | 104 | 104 |
| MAF carbon (parts) | 170 | 170 | 170 | 170 | 170 | 170 |
| Zinc oxide (parts) | 5.5 | 5.5 | 5.5 | 5.5 | 5.5 | 5.5 |
| Mixture of solid paraffin and microcrystalline wax (parts) | 1.8 | 1.8 | 1.8 | 1.8 | 1.8 | 1.8 |
| 2,2,4-trimethyl-1,2-dihydroquinoline polymer (parts) | 3.7 | 3.7 | 3.7 | 3.7 | 3.7 | 3.7 |
| N-isopropyl-N'-phenyl-p-phenylenediamine (parts) | 3.7 | 3.7 | 3.7 | 3.7 | 3.7 | 3.7 |
| Sulfur (parts) | 2.7 | 2.7 | 2.7 | 2.7 | 2.7 | 2.7 |
| Di-2-benzothiazolyl disulfide (parts) | 2.7 | 2.7 | 2.7 | 2.7 | 2.7 | 2.7 |
| Tetramethylthiuram disulfide (parts) | 0.9 | 0.9 | 0.9 | 0.9 | 0.9 | 0.9 |
| Amount of acrylonitrile units of nitrile copolymer rubber as a whole (wt %) | 20.8 | 47.0 | 33.5 | 33.5 | 33.5 | 33.5 |
| Product ($\alpha \times \beta$) | 139,400 | 139,400 | 93,500 | 323,000 | 82,000 | 205,000 |
| Ratio ($\alpha \times \beta$)/$\gamma$ | 6,702 | 2,966 | 2,791 | 9,642 | 2,448 | 6,119 |
| Evaluation | | | | | | |
| Brittle temperature (° C.) | −48 | −28 | −45 | Not measurable | −40 | Not measurable |
| Dynamic ozone test (cracking time) (h) | 96 | 72 | 24 | | 24 | |
| Oil resistance (Fuel-C) ($\Delta$ V) | +17 | −6 | +4 | | +4 | |
| Compression set (%) | 61 | 69 | 65 | | 69 | |

In Table 1 and Table 2, "Product (α×β)" is the product (α×β) of the average polymerization degree α of the vinyl chloride resin (B) and the ratio of content β of the vinyl chloride resin (B), while the "ratio ((α×β/γ)" is the ratio of the product (α×β) and the ratio of content γ of the α,β-ethylenically unsaturated nitrile monomer units.

As shown in Table 1 and Table 2, a cross-linked rubber obtained using a composition comprising 100 parts by weight of a nitrile copolymer rubber (A) containing 22 to 45 wt % of α,β-ethylenically unsaturated nitrile monomer units and 70 to 140 parts by weight of a vinyl chloride resin (B) having an average polymerization degree of 1200 to 2200 was low in brittle temperature, excellent in cold resistance, long in time of cracking in a dynamic ozone test, excellent in ozone resistance, and, further, excellent in oil resistance and compression set resistance as well (Examples 1 to 10).

On the other hand, when using a nitrile copolymer rubber having a ratio of content of α,β-ethylenically unsaturated nitrile monomer units of less than 22 wt %, the obtained cross-linked rubber was inferior in oil resistance (Comparative Example 1).

Further, when using a nitrile copolymer rubber having a ratio of content of the α,β-ethylenically unsaturated nitrile monomer units of over 45 wt %, the obtained cross-linked rubber was inferior in cold resistance and ozone resistance (Comparative Example 2).

Further, when the amount of the vinyl chloride resin (B) was too small, the obtained cross-linked rubber was inferior in ozone resistance (Comparative Example 3).

Further, when the amount of the vinyl chloride resin was too large or if the average polymerization degree was over 2200, the processability remarkably falls so that kneading of the nitrile copolymer rubber and the vinyl chloride resin became difficult and a good composition could not be obtained (Comparative Examples 4 and 6).

Furthermore, when using a vinyl chloride resin having an average polymerization degree of less than 1200, the obtained cross-linked rubber was inferior in ozone resistance (Comparative Example 5).

The invention claimed is:

1. A nitrile copolymer rubber composition comprising a nitrile copolymer rubber (A) containing 22 to 45 wt % of α,β-ethylenically unsaturated nitrile monomer units, a vinyl chloride resin (B) having an average polymerization degree of 1200 to 2200, and a liquid nitrile rubber (C), wherein
    a ratio of content of the vinyl chloride resin (B) with respect to 100 parts by weight of the nitrile copolymer rubber (A) is 70 to 140 parts by weight.

2. The nitrile copolymer rubber composition according to claim 1, wherein
    when an average polymerization degree of the vinyl chloride resin (B) is defined as α and a ratio of content of the vinyl chloride resin (B) with respect to 100 parts by weight of the nitrile copolymer rubber (A) is defined as β parts by weight, the product (α×β) of the average polymerization degree α of the vinyl chloride resin (B) and the ratio of content β of the vinyl chloride resin (B) is 100,000 or more, and,
    when a ratio of content of the α,β-ethylenically unsaturated nitrile monomer units in the nitrile copolymer rubber (A) is defined as γ wt %, the ratio ((α×β)/γ) of the product (α×β) and the ratio of content γ of the α,β-ethylenically unsaturated nitrile monomer units is 3,000 to 6,000.

3. The nitrile copolymer rubber composition according to claim 1, wherein a ratio of content of the liquid nitrile rubber (C) with respect to 100 parts by weight of the nitrile copolymer rubber (A) is 5 to 50 parts by weight.

4. The nitrile copolymer rubber composition according to claim 1, further comprising a plasticizer.

5. The nitrile copolymer rubber composition according to claim 4, wherein the plasticizer is an ester compound of a dibasic acid and an ether bond-containing alcohol.

6. A cross-linkable rubber composition obtained by blending a cross-linking agent into a nitrile copolymer rubber composition according to claim 1.

7. A cross-linked rubber obtained by cross-linking a cross-linkable rubber composition according to claim 6.

8. The cross-linked rubber according to claim 7, wherein a brittle temperature is −30° C. or less.

* * * * *